C. J. COLEMAN.
STARTING MEANS FOR INTERNAL COMBUSTION ENGINES.
APPLICATION FILED OCT. 7, 1903. -RENEWED JULY 20, 1912.
1,053,360. Patented Feb. 18, 1913.
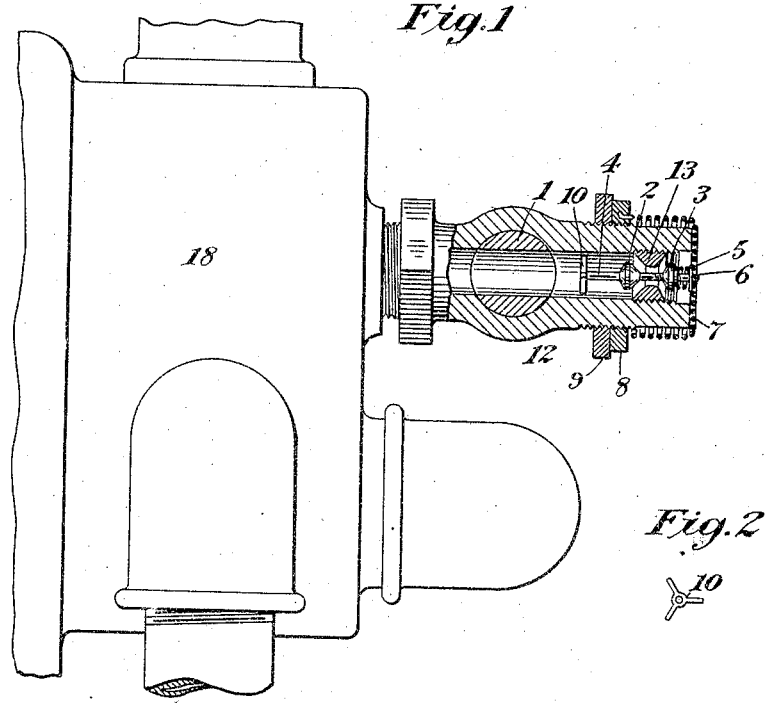
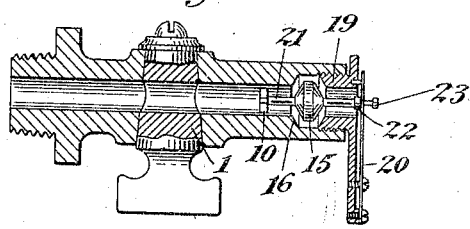

UNITED STATES PATENT OFFICE.

CLYDE J. COLEMAN, OF ROCKAWAY, NEW JERSEY, ASSIGNOR TO CONRAD HUBERT, OF NEW YORK, N. Y.

STARTING MEANS FOR INTERNAL-COMBUSTION ENGINES.

1,053,360.   Specification of Letters Patent.   Patented Feb. 18, 1913.

Application filed October 7, 1903, Serial No. 176,165.   Renewed July 20, 1912.   Serial No. 710,894.

*To all whom it may concern:*

Be it known that I, CLYDE J. COLEMAN, a citizen of the United States, residing at Rockaway, in the county of Morris and State of New Jersey, have invented certain new and useful Improvements in Starting Means for Internal-Combustion Engines, of which the following is a specification, reference being had therein to the accompanying drawing, forming a part thereof.

My invention relates to starting means for internal combustion engines and has for its objects simplicity of construction and positiveness of operation.

According to my invention relief controlling means are provided for controlling a vent from the working chamber of the engine during the starting operation, such relief controlling means being responsive to external pressure during the charging of the engine to close the relief vent and responsive to the compression pressure of the engine to open the relief vent and responsive to the combustion or explosion pressure of the engine to close the relief vent.

According to my invention the relief controlling means may also be so constructed as to be responsive to increase of speed of the engine and the increased compression pressure resulting therefrom so as to restrict the vent during the compression stroke in direct relation to the increase of speed and thereby to increase the residual charge as the speed is increased and thus rapidly and cumulatively to increase the power and speed of the engine.

According to my invention manual controlling means are provided whereby the vent may be opened or closed to permit or prevent the automatic relief controlling operation.

My invention also includes various improvements in the construction and combination of parts.

I will now describe the device illustrated in the drawings embodying my invention and will thereafter point out the novel features in claims.

Figure 1 is a side elevation, partly in section, of relief controlling means in place upon the valve chest of an explosive engine. Fig. 2 is a detail of a spider to be placed in the vent passage to receive the stem of the vent controlling valve, and Fig. 3 is a central longitudinal section of a modified construction of relief controlling means.

The relief controlling means comprises a relief cock 1 upon the valve chest 18 of the engine and adapted to be manually operated, and automatic relief controlling means conveniently mounted upon an extension of the casing 12 of the valve cock. The automatic relief controlling means comprises a double valve consisting of two oppositely facing valves 2 and 3 upon the same valve stem 4, the inner valve 2 closing outwardly and the outer valve 3 closing inwardly against properly formed seats in the valve plug or tube 13, this valve plug or tube being threaded into the vent orifice of the cock. The valve stem 4 is guided at its inner end in a spider 10 and is guided and controlled at its outer end by a combined spiral and helical spring 7, this spring being held at its inner end in an adjusting nut 8 threaded upon the outer part of the casing and this spring extends outwardly along the casing in helical form to the end of the casing and extends inwardly to the valve stem in spiral form and has sufficient resisting power to hold the valve in open position against the compression pressure of the engine when the engine is started but has not sufficient resisting power to hold the valve open against the explosion or combustion pressure of the engine. This spring is adjustable by means of the holding nut 8 and a lock nut 9. On the stem 4 of the controlling valve, between the outer valve 3 and a guide plate 6 secured to the spring 7, is arranged a light helical spring 5 which holds the outer valve normally closed but which yields to the compression pressure of the engine to permit the valve to open, the valve stem 4 sliding in the guide plate 6 during such movement. This light spring 5 is however very nearly or completely compressed by the compression pressure so that under the heavier explosion or combustion pressure it merely conveys the pressure of the valve to the stronger spring 7.

Normally the light spring 5 will hold the outer valve closed, but in the charging stroke of the engine there will be a preponderance of external pressure or a "suction" as it is termed, which will press the outer valve tightly against its seat and effectually prevent the weakening of the charge by the entrance of air at the relief vent. During the compression stroke of the engine the internal pressure will be sufficient to compress the light spring 5 and thereby cause the outer valve to be opened until the resistance of the strong spring 7 is encountered, and this resistance as aforesaid will be sufficient to prevent such further movement of the valve as would result in closing the inner valve 2 and the vent orifice will therefore be opened during the compression stroke of the engine and will relieve the compression as is desirable in the starting operation. Upon the ignition of the residual charge the explosion or combustion will be sufficient to overcome the strong spring 7 and to close the inner valve and thereby to confine the explosion and permit its full utilization in driving the engine. The valve opening or vent is restricted by a seat plug 13 and as the speed of the engine increases under the successive explosions of the residual charges, the internal pressure of compression upon the relief controlling valve will increase so as to cause a further outward movement thereof, either by movement of the strong spring 7 or greater compression of the light spring 5, and this will result in a further restriction of the vent orifice, permitting a large portion of the charge to remain in the engine so that a greater explosive force may be developed, and thus, cumulatively, the increased speed will build up a greater retention of the charge and a heavier explosion, and evidently by proper adjustment, of the vent area and the resilient means, this increased retention of the charge may be continued to the point of very nearly or substantially retaining the entire charge when the normal speed of the engine is attained. Upon the attainment of the normal speed, the operator should close the cock 1, thereby altogether closing the vent and discontinuing the automatic operation of the relief controlling means.

My improved relief controlling means may be used in connection with a starting motor or power device or may be used in connection with a manual starting operation by means of a crank or strap or other non-automatic device.

In the modified construction shown in Fig. 3, the valves and seats are reversed, a double valve 15 being arranged so as to close inwardly upon an inner seat 16 formed in the casing and to close outwardly upon an outer seat in seat plug 19. This seat plug 19 projects out of the casing and has an arm carrying a single flat controlling spring 20, this flat controlling spring being of about the same resisting power as the strong spring 7 of the construction shown in Fig. 1. The valve stem 21 has a limited free movement relatively to the spring 20, governed by an inner shoulder 22 and an outer shoulder 23, and the seating of the valve during the charging or suction stroke of the engine is entirely caused by the preponderance of external pressure. During the compression stroke the valve moves outwardly until its shoulder 22 comes against the spring 20 and it is then held by the spring in open position. In other respects the operation is the same as that above described of the construction shown in Fig. 1.

It is obvious that various modifications may be made in the construction shown and above particularly described within the spirit and scope of my invention.

I claim:—

1. Relief-vent controlling means for internal combustion engines comprising a casing having a vent therein, a valve movable inward and outward and arranged to close the vent in either extreme position, a part adjustably fitted in the casing having valve-seats for such valve, and a spring located outside the casing and controlling the valve.

2. Relief-vent controlling means for internal combustion engines comprising a casing having a vent therein, a valve movable inward and outward and arranged to close the vent in either extreme position, such valve having faces converging with respect to each other, a removable part fitted in the casing having valve seats for such valve, and a spring located outside the casing and controlling the valve.

3. Relief vent controlling means for internal combustion engines comprising a casing having a vent therein, a valve movable inward and outward and arranged to close the vent in either extreme position, and a spring controlling the valve and having a spiral part at the end of the casing and a helical part exteriorly encircling the casing, such spiral part providing a guiding means for the valve stem.

4. Relief vent controlling means for internal combustion engines comprising a casing having a vent therein, a valve movable inward and outward and arranged to close the vent in either extreme position, a spring controlling the valve, such spring having a helical part exteriorly encircling the casing and a spiral part at the end of the casing, the spiral part being adapted to provide a guiding means for the valve stem, and adjusting means exteriorly threaded on the casing and controlling the spring, substantially as set forth.

5. Relief vent controlling means for internal combustion engines comprising a casing having a vent therein, a valve movable inward and outward and arranged to close the vent in either extreme position, a part adjustably fitted in the casing having valve seats for the valve, and a spring located outside the casing and controlling the valve and arranged to hold such valve normally yieldingly in the closed position.

6. Relief controlling means for internal combustion engines comprising a casing having a vent, a valve and a spring at the outer end of the vent bearing against and controlling such valve and partially closing said vent, whereby to restrict the passage of a charge therethrough.

7. Relief controlling means for internal combustion engines comprising a casing having a vent, a valve and a helical spring at the atmospheric end of the vent bearing against and controlling such valve and partially closing said vent, whereby to restrict the passage of a charge therethrough.

8. Relief controlling means for internal combustion engines comprising a casing having a vent, a valve and pressure resisting means at the outer opening of the vent controlling such valve and guided on the outer surface of the casing.

9. Relief vent controlling means for internal combustion engines comprising a casing having a vent therein, a valve movable inward and outward and arranged to close the vent in either extreme position, and a retractive member at the outer end of the vent arranged to guide and control the movement of the valve.

10. Relief controlling means for internal combustion engines comprising a casing having a vent, a valve having an intermediate open position and movable inward and outward from such open position to close the vent and freely movable from the intermediate to the inner position, and pressure resisting means secured to a part of the casing and arranged to control and guide such valve from the intermediate to the outer position.

11. Relief vent controlling means for internal combustion engines comprising a casing having a vent therein, a valve movable inward and outward and arranged to close the vent in either extreme position, a spring at the end of the valve stem adapted to hold the valve normally in the closed position, and a second spring at the end of the vent adapted to control the valve and to permit the movement of the valve from the middle to the extreme outward position upon the attainment of a predetermined pressure.

In testimony whereof I have affixed my signature in presence of two witnesses.

CLYDE J. COLEMAN.

Witnesses:
HENRY BARNES,
HENRY D. WILLIAMS.